(12) United States Patent
Noh et al.

(10) Patent No.: US 11,251,527 B2
(45) Date of Patent: Feb. 15, 2022

(54) ANTENNA MODULE

(71) Applicant: AMOTECH CO., LTD., Incheon (KR)

(72) Inventors: Jin Won Noh, Gwangju (KR); Hyung Il Baek, Yongin-si (KR); Joo-Seung Maeng, Incheon (KR); Ki Sang Lim, Incheon (KR); Seong Hyun Kim, Gwacheon-si (KR); Chung Ha Back, Yeongcheon-si (KR); Eui Jin Jeong, Incheon (KR); Du Hyun Song, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 23 days.

(21) Appl. No.: 16/760,879

(22) PCT Filed: Oct. 31, 2018

(86) PCT No.: PCT/KR2018/013125
§ 371 (c)(1),
(2) Date: Apr. 30, 2020

(87) PCT Pub. No.: WO2019/088708
PCT Pub. Date: May 9, 2019

(65) Prior Publication Data
US 2021/0184354 A1    Jun. 17, 2021

(30) Foreign Application Priority Data

Nov. 3, 2017 (KR) .................. 10-2017-0145867

(51) Int. Cl.
*H01Q 1/24* (2006.01)
*H01Q 7/00* (2006.01)
(Continued)

(52) U.S. Cl.
CPC ............. *H01Q 7/00* (2013.01); *H01Q 1/2208* (2013.01); *H01Q 1/243* (2013.01); *H01Q 1/38* (2013.01)

(58) Field of Classification Search
CPC .......... H01Q 1/22; H01Q 1/2208; H01Q 1/24; H01Q 1/243; H01Q 1/38; H01Q 7/00
See application file for complete search history.

(56) References Cited

U.S. PATENT DOCUMENTS 8,738,103 B2 *  5/2014  Puente Baliarda ...... H01Q 1/36
                                                                        455/575.7
10,290,934 B2   5/2019  Tomonari et al.
(Continued)

FOREIGN PATENT DOCUMENTS

JP    2016-225675 A    12/2016
KR    10-2014-0102617 A    8/2014
(Continued)

OTHER PUBLICATIONS

KR Office Action dated Feb. 7, 2019 as received in Application No. 10-2017-0145867.
(Continued)

*Primary Examiner* — Thien M Le
(74) *Attorney, Agent, or Firm* — Maschoff Brennan (57) ABSTRACT

Provided is an antenna module in which magnetic sheets are disposed on one surface and the other surface of an antenna sheet having a plurality of radiation patterns formed thereon, and an overlapping area between the magnetic sheets is formed to maximize antenna performance for electronic payment, short-range communication, and wireless charging. The provided antenna module comprises: the antenna sheet having radiation patterns formed thereon; a first magnetic sheet disposed on one side of the antenna sheet; and a second magnetic sheet disposed on the other side of the
(Continued)

antenna sheet, wherein the first magnetic sheet and the second magnetic sheet form an overlapping area.

10 Claims, 5 Drawing Sheets

(51) Int. Cl.
    *H01Q 1/22*          (2006.01)
    *H01Q 1/38*          (2006.01)

(56) References Cited

U.S. PATENT DOCUMENTS

| | | | | |
|---|---|---|---|---|
| 2009/0305635 | A1* | 12/2009 | Osamura | H01Q 1/2208 |
| | | | | 455/41.2 |
| 2010/0237709 | A1* | 9/2010 | Hall | B60L 53/64 |
| | | | | 307/104 |
| 2012/0092222 | A1* | 4/2012 | Kato | H01Q 21/0025 |
| | | | | 343/742 |
| 2012/0162033 | A1* | 6/2012 | Togashi | H01Q 5/378 |
| | | | | 343/720 |
| 2012/0313742 | A1* | 12/2012 | Kurs | H03H 7/40 |
| | | | | 336/180 |
| 2018/0138580 | A1* | 5/2018 | Kim | H01Q 9/0421 |
| 2018/0212326 | A1 | 7/2018 | Orihara | |
| 2018/0277933 | A1 | 9/2018 | Kim et al. | |
| 2019/0208636 | A1* | 7/2019 | Kato | G06K 19/0723 |

FOREIGN PATENT DOCUMENTS

| | | |
|---|---|---|
| KR | 10-2015-0125597 A | 11/2015 |
| KR | 10-2017-0033253 A | 3/2017 |
| KR | 10-1723843 B1 | 4/2017 |
| KR | 10-2017-0093740 A | 8/2017 |

OTHER PUBLICATIONS

KR Decision to Grant dated Apr. 29, 2019 as received in Application No. 10-2017-0145867.

* cited by examiner

ANTENNA MODULE

TECHNICAL FIELD

The present disclosure relates to an antenna module, and more particularly, to an antenna module which is embedded in a portable terminal to perform at least one of electronic payment, wireless charging, and near field communication.

BACKGROUND ART

With the development of a technology, portable terminals such as mobile phones, PDAs, PMPs, navigations, and laptops additionally provide functions such as near field communication between DMBs, wireless Internet, and devices in addition to basic functions such as call, video/music playback, and direction guidance. Accordingly, the portable terminal has a plurality of antennas for wireless communication, such as wireless Internet and Bluetooth.

In addition, recently, there is a trend to apply functions such as information exchange between terminals, payment, ticket reservation, and search by using near field communication (that is, NFC) to the portable terminal. To this end, the portable terminal is mounted with an antenna module (that is, NFC antenna module) used in a near field communication method. At this time, the NFC antenna module used, as one of an electronic tag (RFID), is a contactless near field wireless communication module which uses a frequency band of approximately 13.56 MHz and transmits data between terminals close to each other at a distance of about 10 cm. The NFC is widely utilized not only for the payment, but also for the transmission of goods information in supermarkets or general stores or travel information for visitors, transportation, access control locks, and the like.

In addition, recently, as functions related to electronic payment using a portable terminal such as Apple Pay or Samsung Pay are required, an antenna for electronic payment is mounted on the portable terminal. For example, since Samsung Pay performs the electronic payment using a magnetic secure transmission method, a Magnetic Secure Transmission (MST) antenna is mounted in the portable terminal supporting Samsung Pay.

Meanwhile, as the miniaturization and thinning required in the portable terminal market is required, the size and thickness of the portable terminal is reduced, and the mounting space of the internal parts is being reduced.

Various types of antenna modules have been developed to minimize the area and thickness in accordance with these market demands.

However, there are problems in that the MST antenna module used for electronic payment is formed in the form of winding the coil, thereby increasing a defect rate when the antenna module is manufactured, and degrading the performance of the antenna module due to various causes of the occurrence of the short of the coil, irregular winding caused by the bending, distortion caused by a thin material, and the like in terms of miniaturization and thinning.

In addition, there is a problem in that when a plurality of antennas are simultaneously mounted, as the portable terminal is miniaturized, a mounting space is insufficient. Accordingly, there is a demand in the market for an integrated antenna in which a near field communication antenna and an MST antenna are integrated.

DISCLOSURE

Technical Problem

The present disclosure is proposed in consideration of the aforementioned circumstances, and an object of the present disclosure is to provide an antenna module, which disposes a magnetic sheet on one surface and the other surface of an antenna sheet on which a plurality of radiation patterns are formed, and forms an overlapping area between the magnetic sheets, thereby maximizing antenna performance for electronic payment, near field communication, and wireless charging.

Technical Solution

For achieving the object, an antenna module according to an embodiment of the present disclosure includes an antenna sheet which has a radiation pattern formed thereon, a first magnetic sheet which is disposed on one surface of the antenna sheet, and a second magnetic sheet which is disposed on the other surface of the antenna sheet, and the first magnetic sheet and the second magnetic sheet form an overlapping area.

For achieving the object, an antenna module according to another embodiment of the present disclosure includes an antenna sheet which has a radiation pattern formed thereon, a first magnetic sheet which is disposed on one surface of the antenna sheet, a second magnetic sheet which is disposed on the other surface of the antenna sheet, and a third magnetic sheet which is disposed on one surface of the antenna sheet, and spaced apart from the first magnetic sheet, and the first magnetic sheet and the second magnetic sheet form a first overlapping area, and the second magnetic sheet and the third magnetic sheet form a second overlapping area.

Advantageous Effects

According to the present disclosure, the antenna module may have the magnetic sheets disposed on one surface and the other surface of the antenna sheet on which the plurality of radiation patterns are formed, and have the overlapping area formed between the magnetic sheets, thereby maximizing antenna performance for electronic payment, near field communication and wireless charging.

MODE FOR INVENTION

Hereinafter, for specifically describing the present disclosure so that those skilled in the art to which the present disclosure pertains may easily carry out the technical spirit of the present disclosure, the most preferred embodiment of the present disclosure will be described with reference to the accompanying drawings. First, in adding the reference numerals to components of each drawing, it should be noted that the same components have the same reference numerals as possible even though they are illustrated on different drawings. In addition, in describing the present disclosure, when it is determined that detailed descriptions of related known configurations or functions may obscure the subject matter of the present disclosure, the detailed descriptions thereof will be omitted.

An antenna module according to an embodiment of the present disclosure is mounted in a rear cover or a main body of a portable terminal. The antenna module operates as an antenna for wireless charging (WPC), electronic payment (MST), and near field communication (NFC) of the portable terminal.

Figure 1:
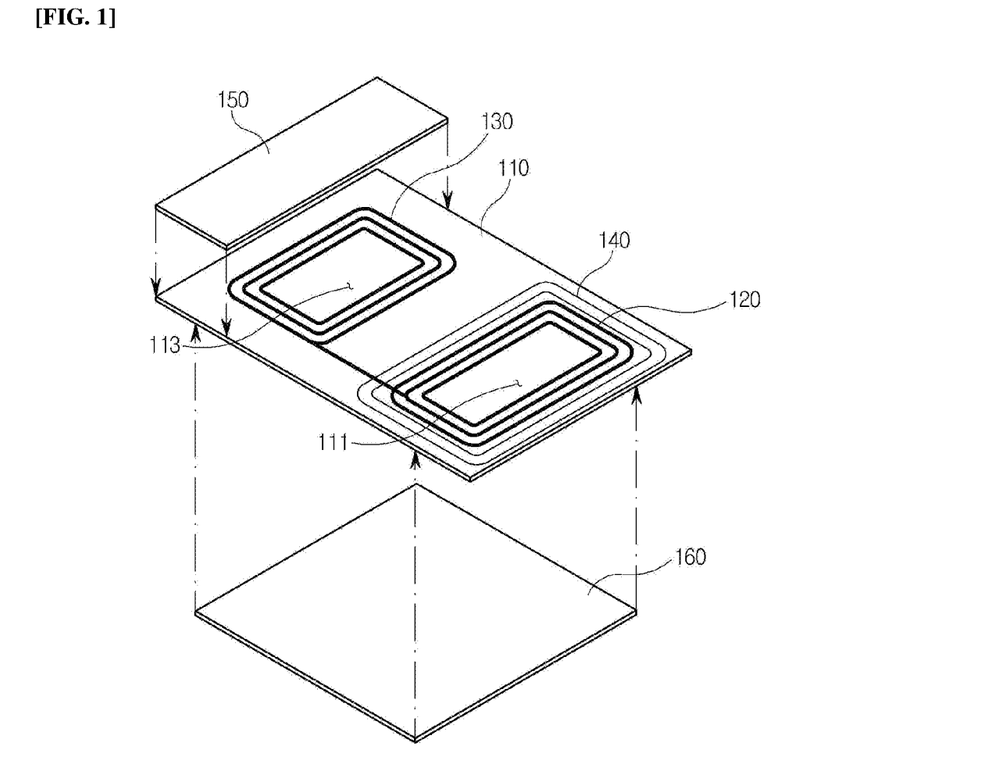
FIGS. 1 and 2 are diagrams for explaining an antenna module according to a first embodiment of the present disclosure.
Figure 2:
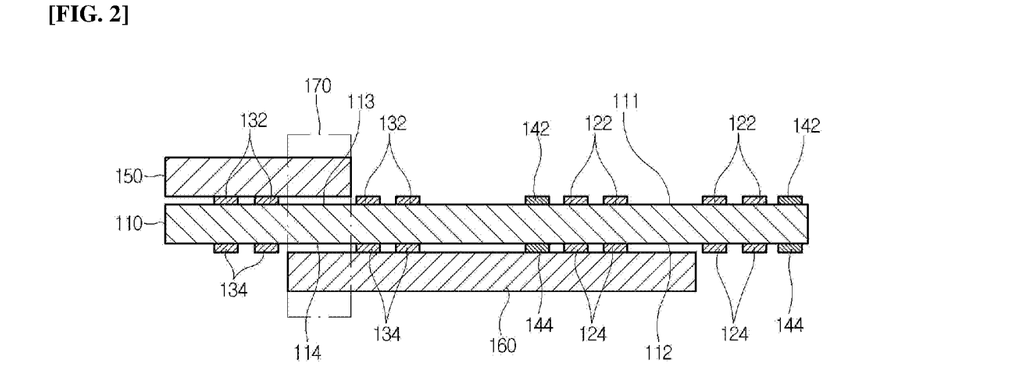

Referring to FIGS. 1 and 2, an antenna module according to a first embodiment of the present disclosure includes an antenna sheet 110, a first magnetic sheet 150, and a second magnetic sheet 160.

A first electronic payment radiation pattern 120 is formed on the antenna sheet 110.

The first electronic payment radiation pattern 120 is formed on the antenna sheet 110, and may be formed in a loop shape wound multiple times. The first electronic payment radiation pattern 120 is disposed adjacent to a first side of the antenna sheet 110.

The first electronic payment radiation pattern 120 includes a first loop pattern 122. The first loop pattern 122 is formed on one surface of the antenna sheet 110. The first loop pattern 122 is wound multiple times along the outer circumference of a first area 111 on one surface of the antenna sheet 110. The first loop pattern 122 is disposed adjacent to the first side on one surface of the antenna sheet 110.

The first electronic payment radiation pattern 120 may further include a second loop pattern 124. The second loop pattern 124 is formed on the other surface of the antenna sheet 110. The second loop pattern 124 is disposed adjacent to the first side on the other surface of the antenna sheet 110. The second loop pattern 124 is wound multiple times along the outer circumference of a second area 112 on the other surface of the antenna sheet 110. The second loop pattern 124 may be connected to the first loop pattern 122 through a via hole (not illustrated).

The first area 111 and the second area 112 are partial areas of one surface and the other surface of the antenna sheet 110, and may be an area where all or parts thereof are overlapped.

A second electronic payment radiation pattern 130 is formed on the antenna sheet 110.

The second electronic payment radiation pattern 130 is formed on the antenna sheet 110, and may be formed in a loop shape wound multiple times. The second electronic payment radiation pattern 130 is spaced apart from the first electronic payment radiation pattern 120 and disposed adjacent to a second side of the antenna sheet 110. The second electronic payment radiation pattern 130 may also be connected to the first electronic payment radiation pattern 120 to form a single electronic payment radiation pattern.

The second electronic payment radiation pattern 130 includes a third loop pattern 132. The third loop pattern 132 is formed on one surface of the antenna sheet 110. The third loop pattern 132 is wound multiple times along the outer circumference of a third area 113 on one surface of the antenna sheet 110. The third loop pattern 132 is disposed adjacent to the second side on one surface of the antenna sheet 110.

The second electronic payment radiation pattern 130 may further include a fourth loop pattern 134. The fourth loop pattern 134 is formed on the other surface of the antenna sheet 110. The fourth loop pattern 134 is disposed adjacent to the second side on the other surface of the antenna sheet 110. The fourth loop pattern 134 is wound multiple times along the outer circumference of the fourth area 114 on the other surface of the antenna sheet 110. The fourth loop pattern 134 may be connected to the third loop pattern 132 through a via hole (not illustrated).

The third area 113 and the fourth area 114 are partial areas of one surface and the other surface of the antenna sheet 110, and may be an area where all or parts thereof are overlapped.

As described above, although it has been illustrated that the first electronic payment radiation pattern 120 and the second electronic payment radiation pattern 130 are formed on all of one surface and the other surface of the antenna sheet 110, they are not limited thereto and may also be formed on only one of one surface and the other surface thereof.

Of course, one of the first electronic payment radiation pattern 120 and the second electronic payment radiation pattern 130 is formed on all of one surface and the other surface of the antenna sheet 110, and the other one may also be formed on only one of one surface and the other surface thereof.

A near field communication radiation pattern 140 is formed on the antenna sheet 110. The near field communication radiation pattern 140 is formed on the antenna sheet 110, and may be formed in a loop shape wound multiple times. The near field communication radiation pattern 140 is wound multiple times along the outer circumference of the first electronic payment radiation pattern 120 and is disposed adjacent to the first side of the antenna sheet 110.

The near field communication radiation pattern 140 includes a fifth loop pattern 142.

The fifth loop pattern 142 is formed on one surface of the antenna sheet 110. The fifth loop pattern 142 may be formed in a loop shape wound multiple times along the outer circumference of the first loop pattern 122 of the first electronic payment radiation pattern 120. The fifth loop pattern 142 is disposed adjacent to the second side of the antenna sheet 110.

The near field communication radiation pattern 140 includes a sixth loop pattern 144.

The sixth loop pattern 144 is formed on the other surface of the antenna sheet 110. The sixth loop pattern 144 may be formed in a loop shape wound multiple times along the outer circumference of the second loop pattern 124 of the first electronic payment radiation pattern 120. The sixth loop pattern 144 is disposed adjacent to the second side of the antenna sheet 110. The sixth loop pattern 144 is connected to the fifth loop pattern 142 through a via hole (not illustrated) to form the near field communication radiation pattern 140.

As described above, although it has been illustrated and described that the near field communication radiation pattern 140 includes all of the fifth loop pattern 142 and the sixth loop pattern 144, it is not limited thereto and may also include only one of the fifth loop pattern 142 and the sixth loop pattern 144.

The first magnetic sheet 150 is a plate-like substrate or a film made of a magnetic material. For example, the first magnetic sheet 150 is one selected from a nanocrystalline alloy ribbon sheet, an iron-based amorphous ribbon sheet, and a ferrite sheet.

The iron-based amorphous sheet forms properties such as magnetic permeability while curing the iron-based amorphous ribbon through a heat treatment process. At this time, the iron-based amorphous ribbon is, for example, an iron-based magnetic alloy, and the iron-based magnetic alloy may use a Fe—Si—B alloy. The iron-based magnetic alloy is preferably an alloy in which the content of iron (Fe) is 73 to 80 at %, the sum of the contents of silicon (Si) and boron (B) is 15 to 26 at %, and the sum of the contents of copper (Cu) and niobium (Nb) is 1 to 5 at %.

Meanwhile, in the heat treatment process, the iron-based amorphous ribbon is heated at a temperature of about 300° C. to 500° C. for about 0.1 to 10 hours to form an iron-based amorphous sheet.

The nanocrystalline alloy ribbon sheet is, for example, an iron (Fe)-based magnetic alloy. The nanocrystalline alloy ribbon sheet forms properties such as magnetic permeability while curing the iron-based amorphous ribbon through the heat treatment process like the iron-based amorphous sheet. At this time, the iron-based amorphous ribbon is, for example, an iron-based magnetic alloy, and the iron-based magnetic alloy may be a Fe—Si—B—Cu—Nb alloy. In this case, the iron-based magnetic alloy may be an alloy in which the content of the iron (Fe) is 73 to 80 at %, the sum of the contents of silicon (Si) and boron (B) is 15 to 26 at %, and the sum of the contents of copper (Cu) and niobium (Nb) is 1 to 5 at %.

Meanwhile, in the heat treatment process, the iron-based amorphous ribbon is heated at a temperature of about 300° C. to 700° C. for about 30 minutes to 2 hours to form a nanocrystalline sheet on which nanocrystalline is formed.

The first magnetic sheet 150 may also be in a ductile state where heat treatment is not performed on the nanocrystalline alloy ribbon sheet, the iron-based amorphous ribbon sheet, the ferrite sheet, or the like.

The first magnetic sheet 150 is stacked on one of one surface and the other surface of the antenna sheet 110. The first magnetic sheet 150 is stacked on one surface facing the second magnetic sheet 160.

For example, when the second magnetic sheet 160 is stacked on the other surface of the antenna sheet 110, the first magnetic sheet 150 is stacked on one surface of the antenna sheet 110. When the second magnetic sheet 160 is stacked on one surface of the antenna sheet 110, the first magnetic sheet 150 is stacked on the other surface of the antenna sheet 110.

The area of the first magnetic sheet 150 is formed to be narrower than the area of the antenna sheet 110. One side of the first magnetic sheet 150 is disposed on the same line as the second side of the antenna sheet 110. The first magnetic sheet 150 is disposed to extend from the second side of the antenna sheet 110 inward (that is, in a first side direction) to overlap a part of the antenna sheet 110.

The first magnetic sheet 150 overlaps the second electronic payment radiation pattern 130. The first magnetic sheet 150 overlaps parts of the third loop pattern 132 and the fourth loop pattern 134 of the second electronic payment radiation pattern 130.

The second magnetic sheet 160 is a plate-like substrate or a film made of a magnetic material. The second magnetic sheet 160 is made of the same material as the first magnetic sheet 150. The second magnetic sheet 160 may also be made of a different material from the first magnetic sheet 150. The second magnetic sheet 160 is, for example, one selected from the nanocrystalline alloy ribbon sheet, the iron-based amorphous ribbon sheet, and the ferrite sheet.

The second magnetic sheet 160 is stacked on one of one surface and the other surface of the antenna sheet 110. The second magnetic sheet 160 is stacked on one surface facing the first magnetic sheet 150.

For example, when the first magnetic sheet 150 is stacked on the other surface of the antenna sheet 110, the second magnetic sheet 160 is stacked on one surface of the antenna sheet 110. When the first magnetic sheet 150 is stacked on one surface of the antenna sheet 110, the second magnetic sheet 160 is stacked on the other surface of the antenna sheet 110.

The area of the second magnetic sheet 160 is formed to be narrower than the area of the antenna sheet 110. The area of the second magnetic sheet 160 is formed to be broader than the area of the first magnetic sheet 150. One side of the second magnetic sheet 160 is disposed on the same line as the first side of the antenna sheet 110. The second magnetic sheet 160 is disposed to extend from the first side of the antenna sheet 110 inward (that is, in a second side direction) to overlap a part of the antenna sheet 110.

The second magnetic sheet 160 overlaps the first electronic payment radiation pattern 120, the second electronic payment radiation pattern 130, and the near field communication radiation pattern 140. The second magnetic sheet 160 overlaps the entirety of the first loop pattern 122 and the second loop pattern 124 of the first electronic payment radiation pattern 120. The second magnetic sheet 160 overlaps parts of the third loop pattern 132 and the fourth loop pattern 134 of the second electronic payment radiation pattern 130. The second magnetic sheet 160 overlaps the fifth loop pattern 142 and the sixth loop pattern 144 of the near field communication radiation pattern 140.

The first magnetic sheet 150 and the second magnetic sheet 160 form an overlapping area 170. As the first magnetic sheet 150 extends from the first side toward the second side, and the second magnetic sheet 160 extends from the second side toward the first side, the first magnetic sheet 150 and the second magnetic sheet 160 form the overlapping area 170 in an area where the second electronic payment radiation pattern 130 is formed and in a neighboring area.

When the area of the overlapping area 170 is increased, the antenna performance of the electronic payment radiation pattern and the near field communication radiation pattern 140 is improved.

At this time, when the entire second electronic payment radiation pattern 130 and the first magnetic sheet 150 and the second magnetic sheet 160 are disposed to be overlapped with each other to increase the area of the overlapping area 170, a recognition range for electronic payment may be decreased.

Accordingly, the area of the overlapping area 170 may be increased in a range where the second electronic payment radiation pattern 130 and at least parts of the first magnetic sheet 150 and the second magnetic sheet 160 do not overlap the overlapping area 170.

For example, when the other side of the first magnetic sheet 150 is disposed at a position farthest from the second side of the antenna sheet 110 in the third area 113, and the other side of the second magnetic sheet 160 is disposed at a position closest to the second side of the antenna sheet 110 in the fourth area 114, the area of the overlapping area 170 may be maximized.

Figure 3:
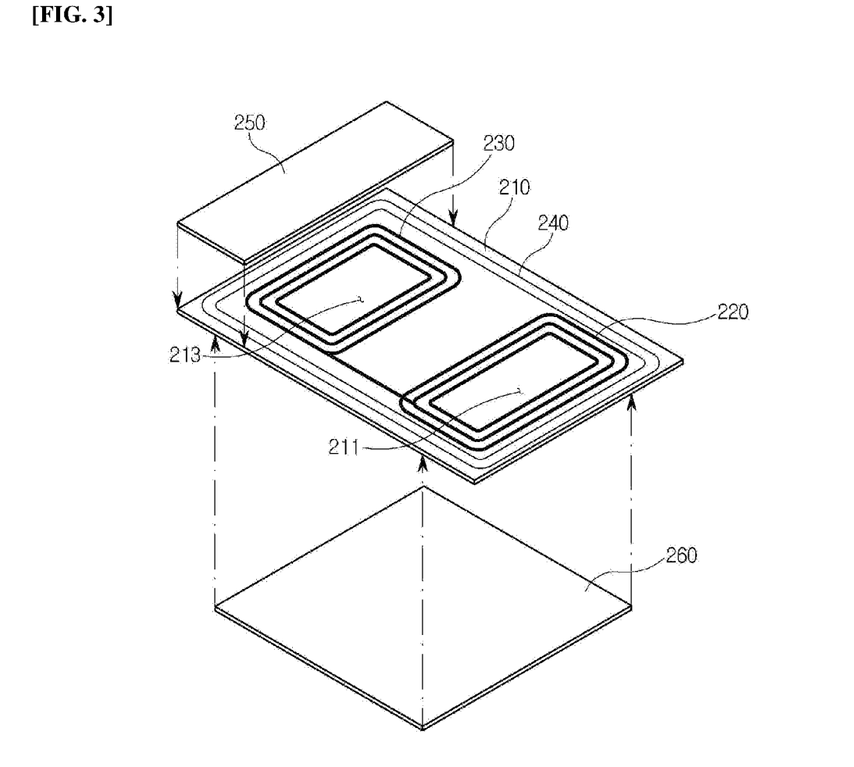
FIGS. 3 and 4 are diagrams for explaining an antenna module according to a second embodiment of the present disclosure.
Figure 4:
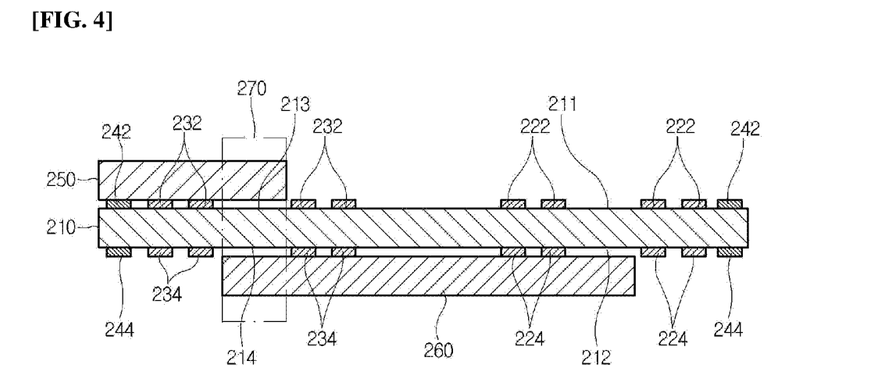

Referring to FIGS. 3 and 4, an antenna module according to a second embodiment of the present disclosure includes an antenna sheet 210, a first magnetic sheet 250, and a second magnetic sheet 260.

The antenna sheet 210 is formed with a first electronic payment radiation pattern 220.

The first electronic payment radiation pattern 220 is formed on the antenna sheet 210, and may be formed in a loop shape wound multiple times. The first electronic payment radiation pattern 220 is disposed adjacent to the first side of the antenna sheet 210.

The first electronic payment radiation pattern 220 includes a first loop pattern 222. The first loop pattern 222 is formed on one surface of the antenna sheet 210. The first loop pattern 222 is wound multiple times along the outer circumference of a first area 211 on one surface of the antenna sheet 210. The first loop pattern 222 is disposed adjacent to the first side on one surface of the antenna sheet 210.

The first electronic payment radiation pattern 220 may further include a second loop pattern 224. The second loop pattern 224 is formed on the other surface of the antenna sheet 210. The second loop pattern 224 is disposed adjacent to the first side on the other surface of the antenna sheet 210. The second loop pattern 224 is wound multiple times along the outer circumference of a second area 212 on the other surface of the antenna sheet 210. The second loop pattern 224 may be connected to the first loop pattern 222 through a via hole (not illustrated).

The first area 211 and the second area 212 are partial areas of one surface and the other surface of the antenna sheet 210, and may be areas where all or parts thereof are overlapped.

A second electronic payment radiation pattern 230 is formed on the antenna sheet 210.

The second electronic payment radiation pattern 230 is formed on the antenna sheet 210, and may be formed in a loop shape wound multiple times. The second electronic payment radiation pattern 230 is spaced apart from the first electronic payment radiation pattern 220 and disposed adjacent to the second side of the antenna sheet 210. The second electronic payment radiation pattern 230 may also be connected to the first electronic payment radiation pattern 220 to form a single electronic payment radiation pattern.

The second electronic payment radiation pattern 230 includes a third loop pattern 232. The third loop pattern 232 is formed on one surface of the antenna sheet 210. The third loop pattern 232 is wound multiple times along the outer circumference of the third area 213 on one surface of the antenna sheet 210. The third loop pattern 232 is disposed adjacent to the second side on one surface of the antenna sheet 210.

The second electronic payment radiation pattern 230 may further include a fourth loop pattern 234. The fourth loop pattern 234 is formed on the other surface of the antenna sheet 210. The fourth loop pattern 234 is disposed adjacent to the second side on the other surface of the antenna sheet 210. The fourth loop pattern 234 is wound multiple times along the outer circumference of the fourth area 214 on the other surface of the antenna sheet 210. The fourth loop pattern 234 may be connected to the third loop pattern 232 through a via hole (not illustrated).

The third area 213 and the fourth area 214 are partial areas of one surface and the other surface of the antenna sheet 210, and may be areas where all or parts thereof are overlapped.

Although it has been illustrated and described above that the first electronic payment radiation pattern 220 and the second electronic payment radiation pattern 230 are formed on all of one surface and the other surface of the antenna sheet 210, they are not limited thereto and may be formed on only one surface of one surface and the other surface thereof.

Of course, one of the first electronic payment radiation pattern 220 and the second electronic payment radiation pattern 230 is formed on all of one surface and the other surface of the antenna sheet 210, and the other thereof may also be formed on only one of one surface and the other surface thereof.

A near field communication radiation pattern 240 may also be formed in a loop shape wound multiple times along the outer circumferences of the first electronic payment radiation pattern 220 and the second electronic payment radiation pattern 230.

The near field communication radiation pattern 240 includes a fifth loop pattern 242 and a sixth loop pattern 244.

The fifth loop pattern 242 is formed on one surface of the antenna sheet 210. The fifth loop pattern 242 may be formed in a loop shape wound multiple times along the outer circumferences of the first loop pattern 222 of the first electronic payment radiation pattern 220 and the third loop pattern 232 of the second electronic payment radiation pattern 230.

The sixth loop pattern 244 is formed on the other surface of the antenna sheet 210. The sixth loop pattern 244 may be formed in a loop shape wound multiple times along the outer circumferences of the second loop pattern 224 of the first electronic payment radiation pattern 220 and the fourth loop pattern 234 of the second electronic payment radiation pattern 230. The sixth loop pattern 244 is disposed adjacent to the second side of the antenna sheet 210. The sixth loop pattern 244 is connected to the fifth loop pattern 242 through a via hole (not illustrated) to form the near field communication radiation pattern 240.

The first magnetic sheet 250 overlaps the second electronic payment radiation pattern 230 and the near field communication radiation pattern 240. The first magnetic sheet 250 overlaps parts of the third loop pattern 232 and the fourth loop pattern 234 of the second electronic payment radiation pattern 230. The first magnetic sheet 250 overlaps parts of the fifth loop pattern 242 and the sixth loop pattern 244 of the near field communication radiation pattern 240.

The second magnetic sheet 260 overlaps the first electronic payment radiation pattern 220, the second electronic payment radiation pattern 230, and the near field communication radiation pattern 240. The second magnetic sheet 260 overlaps the entirety of the first loop pattern 222 and the second loop pattern 224 of the first electronic payment radiation pattern 220. The second magnetic sheet 260 overlaps parts of the third loop pattern 232 and the fourth loop pattern 234 of the second electronic payment radiation pattern 230. The second magnetic sheet 260 overlaps parts of the fifth loop pattern 242 and the sixth loop pattern 244 of the near field communication radiation pattern 240.

The first magnetic sheet 250 and the second magnetic sheet 260 form an overlapping area 270. As the first magnetic sheet 250 extends from the first side toward the second side, and the second magnetic sheet 260 extends from the second side toward the first side, the first magnetic sheet 250 and the second magnetic sheet 260 form the overlapping area 270 in an area where the second electronic payment radiation pattern 230 is formed and in a neighboring area.

When the area of the overlapping area 270 is increased, the antenna performance of the electronic payment radiation pattern and the near field communication radiation pattern 240 is improved.

At this time, when the entire second electronic payment radiation pattern 230 and the first magnetic sheet 250 and the second magnetic sheet 260 are disposed to be overlapped with each other to increase the area of the overlapping area 270, a recognition range for electronic payment may be decreased.

Accordingly, the area of the overlapping area 270 may be increased in a range where the second electronic payment radiation pattern 230 and at least parts of the first magnetic sheet 250 and the second magnetic sheet 260 do not overlap the overlapping area 270.

For example, when the other side of the first magnetic sheet 250 is disposed at a position farthest from the second side of the antenna sheet 210 in the third area 213, and the other side of the second magnetic sheet 260 is disposed at a position closest to the second side of the antenna sheet 210 in the fourth area 214, the area of the overlapping area 270 may be maximized.

Figure 5:
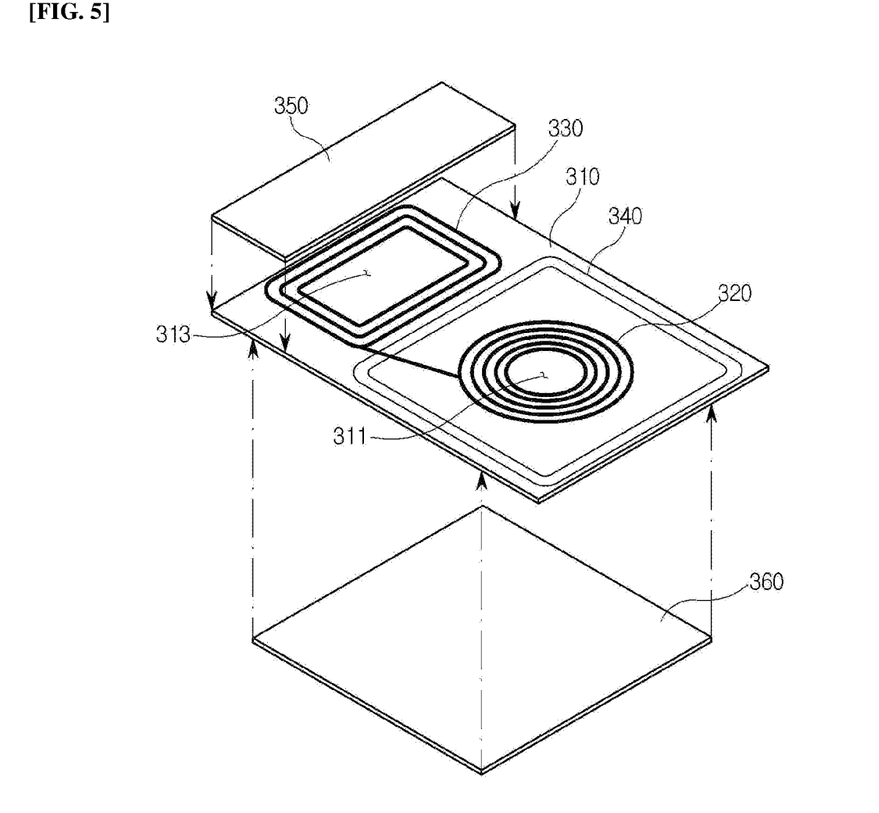
FIGS. 5 and 6 are diagrams for explaining an antenna module according to a third embodiment of the present disclosure.
Figure 6:
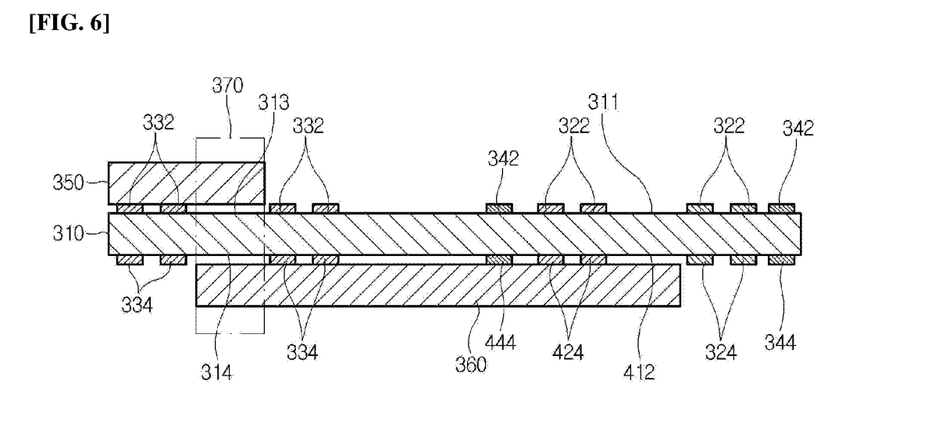

Referring to FIGS. 5 and 6, an antenna module according to a third embodiment of the present disclosure includes an antenna sheet 310, a first magnetic sheet 350 and a second magnetic sheet 360. Hereinafter, a detailed description of the same configuration as in the first embodiment will be omitted.

The antenna sheet 310 may be formed with a wireless charging radiation pattern 320, an electronic payment radiation pattern 330, and a near field communication radiation pattern 340.

The wireless charging radiation pattern 320 is formed on the antenna sheet 310 and may be formed in a loop shape wound multiple times. The wireless charging radiation pattern 320 is disposed adjacent to the first side of the antenna sheet 310.

The wireless charging radiation pattern 320 includes a first loop pattern 322. The first loop pattern 322 is formed on one surface of the antenna sheet 310. The first loop pattern 322 is wound multiple times along the outer circumference of the first area 311 on one surface of the antenna sheet 310. The first loop pattern 322 is disposed adjacent to the first side on one surface of the antenna sheet 310.

The wireless charging radiation pattern 320 may further include a second loop pattern 324. The second loop pattern 324 is formed on the other surface of the antenna sheet 310. The second loop pattern 324 is disposed adjacent to the first side on the other surface of the antenna sheet 310. The second loop pattern 324 is wound multiple times along the outer circumference of the second area 312 on the other surface of the antenna sheet 310. The second loop pattern 324 may be connected to the first loop pattern 322 through a via hole (not illustrated).

The first area 311 and the second area 312 are partial areas of one surface and the other surface of the antenna sheet 310, and may be areas where all or parts thereof are overlapped.

The electronic payment radiation pattern 330 is formed on the antenna sheet 310, and may be formed in a loop shape wound multiple times. The electronic payment radiation pattern 330 is spaced apart from the wireless charging radiation pattern 320 and disposed adjacent to the second side of the antenna sheet 310. The electronic payment radiation pattern 330 may also be connected to the wireless charging radiation pattern 320.

The electronic payment radiation pattern 330 includes a third loop pattern 332. The third loop pattern 332 is formed on one surface of the antenna sheet 310. The third loop pattern 332 is wound multiple times along the outer circumference of a third area 313 on one surface of the antenna sheet 310. The third loop pattern 332 is disposed adjacent to the second side on one surface of the antenna sheet 310.

The electronic payment radiation pattern 330 may further include a fourth loop pattern 334. The fourth loop pattern 334 is formed on the other surface of the antenna sheet 310. The fourth loop pattern 334 is disposed adjacent to the second side on the other surface of the antenna sheet 310. The fourth loop pattern 334 is wound multiple times along the outer circumference of the fourth area 314 on the other surface of the antenna sheet 310. The fourth loop pattern 334 may be connected to the third loop pattern 332 through a via hole (not illustrated).

The third area 313 and the fourth area 314 are partial areas of one surface and the other surface of the antenna sheet 310, and may be areas where all or parts thereof are overlapped.

Although it has been illustrated and described above that the wireless charging radiation pattern 320 and the electronic payment radiation pattern 330 are formed on all of one surface and the other surface of the antenna sheet 310, they are not limited thereto and may also be formed on only one of one surface and the other surface thereof.

The near field communication radiation pattern 340 is formed on the antenna sheet 310, and may be formed in a loop shape wound multiple times. The near field communication radiation pattern 340 is wound multiple times along the outer circumference of the wireless charging radiation pattern 320 and disposed adjacent to the first side of the antenna sheet 310.

The near field communication radiation pattern 340 includes a fifth loop pattern 342 and a sixth loop pattern 344.

The fifth loop pattern 342 is formed on one surface of the antenna sheet 310. The fifth loop pattern 342 may be formed in a loop shape wound multiple times along the outer circumference of the first loop pattern 322 of the wireless charging radiation pattern 320. The fifth loop pattern 342 is disposed adjacent to the second side of the antenna sheet 310.

The sixth loop pattern 344 is formed on the other surface of the antenna sheet 310. The sixth loop pattern 344 may be formed in a loop shape wound multiple times along the outer circumference of the second loop pattern 324 of the wireless charging radiation pattern 320. The sixth loop pattern 344 is disposed adjacent to the second side of the antenna sheet 310. The sixth loop pattern 344 is connected to the fifth loop pattern 342 through a via hole (not illustrated) to form the near field communication radiation pattern 340.

Although it has been illustrated and described above that the wireless charging radiation pattern 320 includes all of the fifth loop pattern 342 and the sixth loop pattern 344, it is not limited thereto and may also include only one of the fifth loop pattern 342 and the sixth loop pattern 344.

The first magnetic sheet 350 overlaps the electronic payment radiation pattern 330. The first magnetic sheet 350 overlaps parts of the third loop pattern 332 and the fourth loop pattern 334 of the electronic payment radiation pattern 330.

The second magnetic sheet 360 overlaps the wireless charging radiation pattern 320, the electronic payment radiation pattern 330, and the near field communication radiation pattern 340. The second magnetic sheet 360 overlaps the entirety of the first loop pattern 322 and the second loop pattern 324 of the wireless charging radiation pattern 320. The second magnetic sheet 360 overlaps parts of the third loop pattern 332 and the fourth loop pattern 334 of the electronic payment radiation pattern 330. The second magnetic sheet 360 overlaps the fifth loop pattern 342 and the sixth loop pattern 344 of the near field communication radiation pattern 340.

The first magnetic sheet 350 and the second magnetic sheet 360 form an overlapping area 370. As the first magnetic sheet 350 extends from the first side toward the second side, and the second magnetic sheet 360 extends from the second side toward the first side, the first magnetic sheet 350 and the second magnetic sheet 360 form the overlapping area 370 in an area where the electronic payment radiation pattern 330 is formed and in a neighboring area.

When the area of the overlapping area 370 is increased, the antenna performance of the electronic payment radiation pattern 330 and the near field communication radiation pattern 340 is improved.

At this time, when the entire electronic payment radiation pattern 330 and the first magnetic sheet 350 and the second magnetic sheet 360 are disposed to be overlapped with each other to increase the area of the overlapping area 370, the recognition range for electronic payment may be decreased.

Accordingly, the area of the overlapping area 370 may be increased in a range where the electronic payment radiation pattern 330 and at least parts of the first magnetic sheet 350 and the second magnetic sheet 360 do not overlap the overlapping area 370.

For example, when the other side of the first magnetic sheet 350 is disposed at a position farthest from the second side of the antenna sheet 310 in the third area 313, and the other side of the second magnetic sheet 360 is be disposed at a position closest to the second side of the antenna sheet 310 in the fourth area 314, the area of the overlapping area 370 may be maximized.

Figure 7:
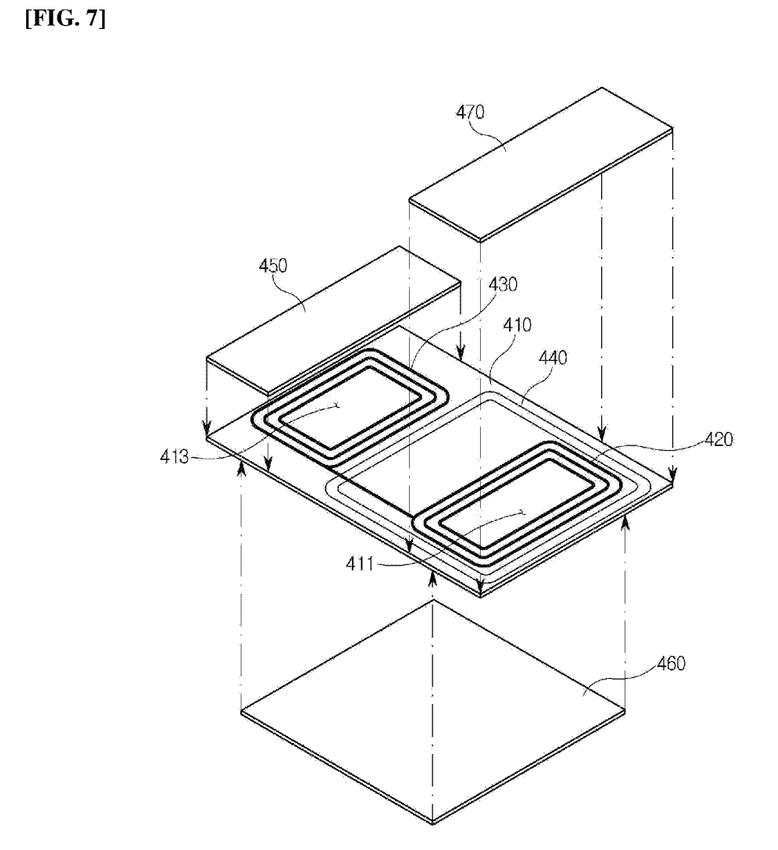
FIGS. 7 and 8 are diagrams for explaining an antenna module according to a fourth embodiment of the present disclosure.
Figure 8:
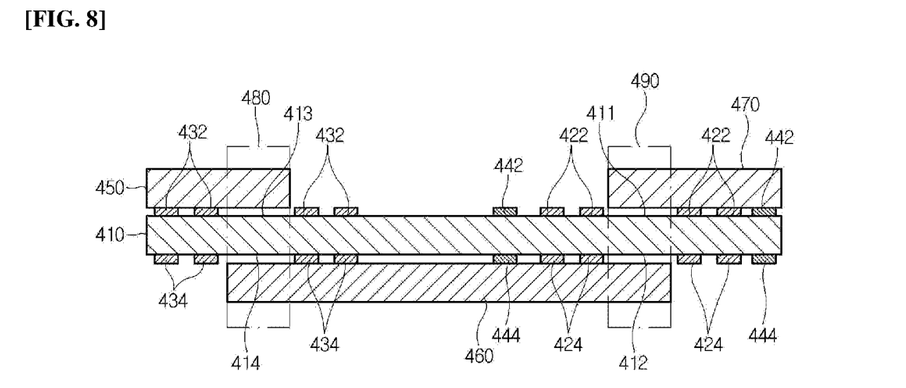

Referring to FIGS. 7 and 8, an antenna module according to a fourth embodiment of the present disclosure includes an antenna sheet 410, a first magnetic sheet 450, a second magnetic sheet 460, and a third magnetic sheet 470.

A first electronic payment radiation pattern 420 is formed on the antenna sheet 410.

The first electronic payment radiation pattern 420 is formed on the antenna sheet 410, and may be formed in a loop shape wound multiple times. The first electronic payment radiation pattern 420 is disposed adjacent to the first side of the antenna sheet 410.

The first electronic payment radiation pattern 420 includes a first loop pattern 422. The first loop pattern 422 is formed on one surface of the antenna sheet 410. The first loop pattern 422 is wound multiple times along the outer circumference of a first area 411 on one surface of the antenna sheet 410. The first loop pattern 422 is disposed adjacent to the first side on one surface of the antenna sheet 410.

The first electronic payment radiation pattern 420 may further include a second loop pattern 424. The second loop pattern 424 is formed on the other surface of the antenna sheet 410. The second loop pattern 424 is disposed adjacent to the first side on the other surface of the antenna sheet 410. The second loop pattern 424 is wound multiple times along the outer circumference of a second area 412 on the other surface of the antenna sheet 410. The second loop pattern 424 may be connected to the first loop pattern 422 through a via hole (not illustrated).

The first area 411 and the second area 412 are partial areas of one surface and the other surface of the antenna sheet 410, and may be areas where all or parts thereof are overlapped.

A second electronic payment radiation pattern 430 is formed on the antenna sheet 410.

The second electronic payment radiation pattern 430 is formed on the antenna sheet 410, and may be formed in a loop shape wound multiple times. The second electronic payment radiation pattern 430 is spaced apart from the first electronic payment radiation pattern 420 and disposed adjacent to the second side of the antenna sheet 410. The second electronic payment radiation pattern 430 may also be connected to the first electronic payment radiation pattern 420 to form a single electronic payment radiation pattern.

The second electronic payment radiation pattern 430 includes a third loop pattern 432. The third loop pattern 432 is formed on one surface of the antenna sheet 410. The third loop pattern 432 is wound multiple times along the outer circumference of the third area 413 on one surface of the antenna sheet 410. The third loop pattern 432 is disposed adjacent to the second side on one surface of the antenna sheet 410.

The second electronic payment radiation pattern 430 may further include a fourth loop pattern 434. The fourth loop pattern 434 is formed on the other surface of the antenna sheet 410. The fourth loop pattern 434 is disposed adjacent to the second side on the other surface of the antenna sheet 410. The fourth loop pattern 434 is wound multiple times along the outer circumference of the fourth area 414 on the other surface of the antenna sheet 410. The fourth loop pattern 434 may be connected to the third loop pattern 432 through a via hole (not illustrated).

The third area 413 and the fourth area 414 are partial areas of one surface and the other surface of the antenna sheet 410, and may be areas where all or parts thereof are overlapped.

Although it has been illustrated and described above that the first electronic payment radiation pattern 420 and the second electronic payment radiation pattern 430 are formed on all of one surface and the other surface of the antenna sheet 410, they are not limited thereto and may also be formed on only one of one surface and the other surface thereof.

Of course, one of the first electronic payment radiation pattern 420 and the second electronic payment radiation pattern 430 is formed on all of one surface and the other surface of the antenna sheet 410, and the other thereof may also be formed on only one surface of one surface and the other surface thereof.

A near field communication radiation pattern 440 is formed on the antenna sheet 410. The near field communication radiation pattern 440 is formed on the antenna sheet 410, and may be formed in a loop shape wound multiple times. The near field communication radiation pattern 440 is wound multiple times along the outer circumference of the first electronic payment radiation pattern 420 and disposed adjacent to the first side of the antenna sheet 410.

The near field communication radiation pattern 440 includes a fifth loop pattern 442.

The fifth loop pattern 442 is formed on one surface of the antenna sheet 410. The fifth loop pattern 442 may be formed in a loop shape wound multiple times along the outer circumference of the first loop pattern 422 of the first electronic payment radiation pattern 420. The fifth loop pattern 442 is disposed adjacent to the second side of the antenna sheet 410.

The near field communication radiation pattern 440 includes a sixth loop pattern 444.

The sixth loop pattern 444 is formed on the other surface of the antenna sheet 410. The sixth loop pattern 444 may be formed in a loop shape wound multiple times along the outer circumference of the second loop pattern 424 of the first electronic payment radiation pattern 420. The sixth loop pattern 444 is disposed adjacent to the second side of the antenna sheet 410. The sixth loop pattern 444 is connected to the sixth loop pattern 444 through a via hole (not illustrated) to form the near field communication radiation pattern 440.

Although it has been illustrated and described above that the near field communication radiation pattern 440 includes all of the fifth loop pattern 442 and the sixth loop pattern 444, it is not limited thereto and may also include only one of the fifth loop pattern 442 and the sixth loop pattern 444.

The first magnetic sheet 450 is a plate-like substrate or a film made of a magnetic material. For example, the first magnetic sheet 450 is one selected from a nanocrystalline alloy ribbon sheet, an iron-based amorphous ribbon sheet, and a ferrite sheet.

The first magnetic sheet 450 is stacked on one of one surface and the other surface of the antenna sheet 410. The first magnetic sheet 450 is stacked on one surface facing the second magnetic sheet 460.

For example, when the second magnetic sheet 460 is stacked on the other surface of the antenna sheet 410, the first magnetic sheet 450 is stacked on one surface of the antenna sheet 410. When the second magnetic sheet 460 is stacked on one surface of the antenna sheet 410, the first magnetic sheet 450 is stacked on the other surface of the antenna sheet 410.

The area of the first magnetic sheet 450 is formed to be narrower than the area of the antenna sheet 410. One side of the first magnetic sheet 450 is disposed on the same line as the second side of the antenna sheet 410. The first magnetic sheet 450 is disposed to extend from the second side of the antenna sheet 410 inward (that is, in a first side direction) to overlap a part of the antenna sheet 410.

The first magnetic sheet 450 overlaps with the second electronic payment radiation pattern 430. The first magnetic sheet 450 overlaps parts of the third loop pattern 432 and the fourth loop pattern 434 of the second electronic payment radiation pattern 430.

The second magnetic sheet 460 is a plate-like substrate or a film made of a magnetic material. The second magnetic sheet 460 is made of the same material as the first magnetic sheet 450. The second magnetic sheet 460 may also be made of a different material from the first magnetic sheet 450. The second magnetic sheet 460 is, for example, one selected from a nanocrystalline alloy ribbon sheet, an iron-based amorphous ribbon sheet, and a ferrite sheet.

The second magnetic sheet 460 is stacked on one of one surface and the other surface of the antenna sheet 410. The second magnetic sheet 460 is stacked on one surface facing the first magnetic sheet 450.

For example, when the first magnetic sheet 450 is stacked on the other surface of the antenna sheet 410, the second magnetic sheet 460 is stacked on one surface of the antenna sheet 410. When the first magnetic sheet 450 is stacked on one surface of the antenna sheet 410, the second magnetic sheet 460 is stacked on the other surface of the antenna sheet 410.

The area of the second magnetic sheet 460 is formed to be narrower than the area of the antenna sheet 410. The area of the second magnetic sheet 460 is formed to be broader than the area of the first magnetic sheet 450. One side of the second magnetic sheet 460 is disposed in the second area 412 of the antenna sheet 410, and the other side thereof is disposed in the fourth area 414 of the antenna sheet 410.

The second magnetic sheet 460 overlaps the first electronic payment radiation pattern 420, the second electronic payment radiation pattern 430, and the near field communication radiation pattern 440. The second magnetic sheet 460 overlaps parts of the first loop pattern 422 and the second loop pattern 424 of the first electronic payment radiation pattern 420. The second magnetic sheet 460 overlaps parts of the third loop pattern 432 and the fourth loop pattern 434 of the second electronic payment radiation pattern 430. The second magnetic sheet 460 overlaps parts of the fifth loop pattern 442 and the sixth loop pattern 444 of the near field communication radiation pattern 440.

As the first magnetic sheet 450 and the second magnetic sheet 460 form a first overlapping area 480. As the first magnetic sheet 450 extends from the first side toward the second side, and the second magnetic sheet 460 is disposed between the second area 412 and the fourth area 414 of the antenna sheet 410, the first magnetic sheet 450 and the second magnetic sheet 460 form the first overlapping pattern 430 in an area where the second electronic payment radiation pattern 430 is formed (that is, the third area 413 and the fourth area 414) and in a neighboring area.

When the area of the first overlapping area 480 is increased, the antenna performance of the electronic payment radiation pattern and the near field communication radiation pattern 440 is improved.

At this time, when the entire second electronic payment radiation pattern 430 and the first magnetic sheet 450 and the second magnetic sheet 460 are disposed to be overlapped with each other to increase the area of the first overlapping area 480, a recognition range for electronic payment may be rather decreased.

Accordingly, the area of the first overlapping area 480 may be increased in a range where the second electronic payment radiation pattern 430 and at least parts of the first magnetic sheet 450 and the second magnetic sheet 460 do not overlap the overlapping area.

For example, when the other side of the first magnetic sheet 450 is disposed at a position farthest from the second side of the antenna sheet 410 in the third area 413, and the other side of the second magnetic sheet 460 is disposed at a position closest to the second side of the antenna sheet 410 in the fourth area 414, the area of the first overlapping area 480 may be maximized.

The third magnetic sheet 470 is a plate-like substrate or a film made of a magnetic material. The third magnetic sheet 470 is made of the same material as the first magnetic sheet 450 and the second magnetic sheet 460. The second magnetic sheet 460 may also be made of a different material from the first magnetic sheet 450. For example, the third magnetic sheet 470 is one selected from a nanocrystalline alloy ribbon sheet, an iron-based amorphous ribbon sheet, and a ferrite sheet.

The third magnetic sheet 470 is stacked on one of one surface and the other surface of the antenna sheet 410. The third magnetic sheet 470 is stacked on one surface facing the second magnetic sheet 460. The third magnetic sheet 470 is stacked on the same surface as the first magnetic sheet 450.

For example, when the second magnetic sheet 460 is stacked on the other surface of the antenna sheet 410, the third magnetic sheet 470 is stacked on one surface of the antenna sheet 410 together with the first magnetic sheet 450. When the second magnetic sheet 460 is stacked on one surface of the antenna sheet 410, the third magnetic sheet 470 is stacked on the other surface of the antenna sheet 410 together with the first magnetic sheet 450.

The area of the third magnetic sheet 470 is formed to be narrower than the area of the second magnetic sheet 460. One side of the third magnetic sheet 470 is disposed on the same line as the first side of the antenna sheet 410. The third magnetic sheet 470 is disposed to extend from the first side of the antenna sheet 410 inward (that is, in a second side direction) to overlap a part of the antenna sheet 410.

The third magnetic sheet 470 overlaps the first electronic payment radiation pattern 420 and the near field communication radiation pattern 440. The third magnetic sheet 470 overlaps parts of the first loop pattern 422 and the second loop pattern 424 of the first electronic payment radiation pattern 420. The third magnetic sheet 470 overlaps parts of the fifth loop pattern 442 and the sixth loop pattern 444 of the near field communication radiation pattern 440.

The second magnetic sheet 460 and the third magnetic sheet 470 form a second overlapping area 490. As the second magnetic sheet 460 is disposed between the second area 412 and the fourth area 414 of the antenna sheet 410, and the third magnetic sheet 470 extends from the second side toward the first side, the second magnetic sheet 460 and the third magnetic sheet 470 form a second overlapping area 490 in an area where the first electronic payment radiation pattern 420 is formed (that is, the first area 411 and the second area 412) and in a neighboring area.

When the area of the second overlapping area 490 is increased, the antenna performance of the electronic payment radiation pattern and the near field communication radiation pattern 440 is improved.

At this time, when the entire first electronic payment radiation pattern 420 and the second magnetic sheet 460 and the third magnetic sheet 470 are disposed to be overlapped with each other to increase the area of the second overlapping area 490, a recognition range for electronic payment may be rather decreased.

Accordingly, the area of the second overlapping area 490 may be increased in a range where the first electronic payment radiation pattern 420 and at least parts of the second magnetic sheet 460 and the third magnetic sheet 470 do not overlap the overlapping area.

For example, when the other side of the second magnetic sheet 460 is disposed at a position closest to the first side of the antenna sheet 410 in the second area 412, and the other side of the third magnetic sheet 470 is disposed at a position farthest from the first side of the antenna sheet 410 in the first area 411, the area of the second overlapping area 490 may be maximized.

Figure 9:
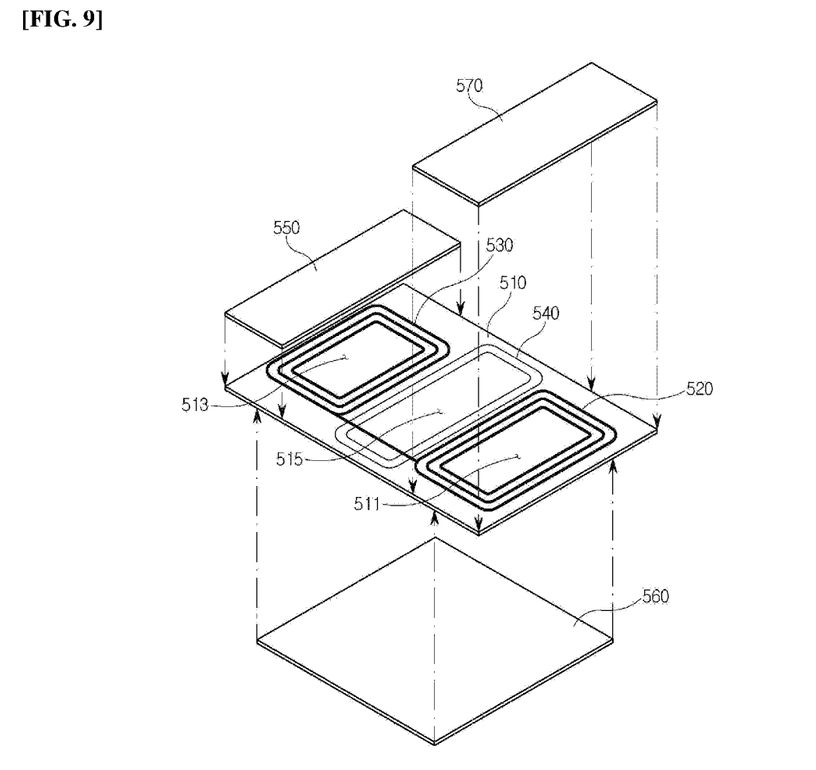
FIGS. 9 and 10 are diagrams for explaining an antenna module according to a fifth embodiment of the present disclosure.
Figure 10:
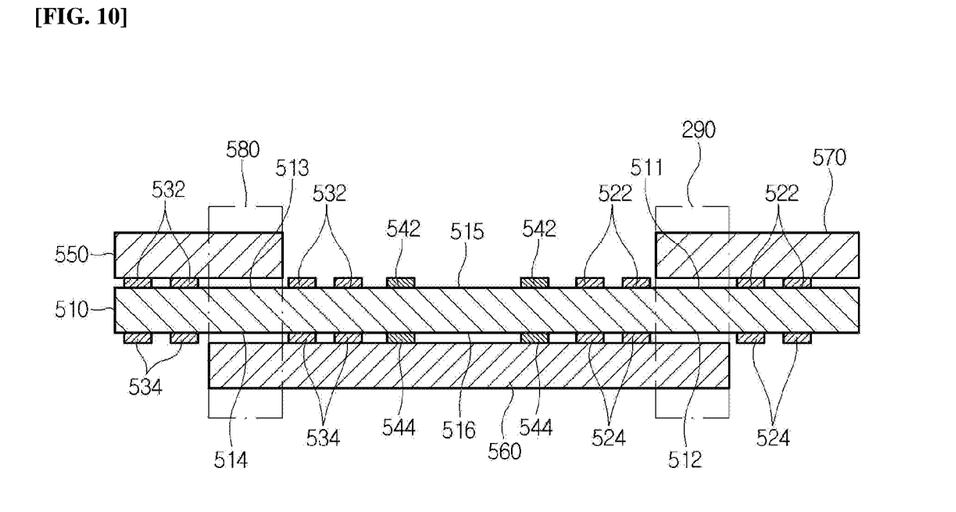

Referring to FIGS. 9 and 10, an antenna module according to a fifth embodiment of the present disclosure includes an antenna sheet 510, a first magnetic sheet 550, a second magnetic sheet 560, and a third magnetic sheet 570.

A first electronic payment radiation pattern 520 is formed on the antenna sheet 510.

The first electronic payment radiation pattern 520 is formed on the antenna sheet 510, and may be formed in a loop shape wound multiple times. The first electronic payment radiation pattern 520 is disposed adjacent to the first side of the antenna sheet 510.

The first electronic payment radiation pattern 520 includes a first loop pattern 522. The first loop pattern 522 is formed on one surface of the antenna sheet 510. The first loop pattern 522 is wound multiple times along the outer circumference of the first area 511 on one surface of the antenna sheet 510. The first loop pattern 522 is disposed adjacent to the first side on one surface of the antenna sheet 510.

The first electronic payment radiation pattern 520 may further include a second loop pattern 524. The second loop pattern 524 is formed on the other surface of the antenna sheet 510. The second loop pattern 524 is disposed adjacent to the first side on the other surface of the antenna sheet 510. The second loop pattern 524 is wound multiple times along the outer circumference of the second area 512 on the other surface of the antenna sheet 510. The second loop pattern 524 may be connected to the first loop pattern 522 through a via hole (not illustrated).

The first area 511 and the second area 512 are partial areas of one surface and the other surface of the antenna sheet 510, and may be areas where all or parts thereof are overlapped.

A second electronic payment radiation pattern 530 is formed on the antenna sheet 510.

The second electronic payment radiation pattern 530 is formed on the antenna sheet 510, and may be formed in a loop shape wound multiple times. The second electronic payment radiation pattern 530 is spaced apart from the first electronic payment radiation pattern 520 and disposed adjacent to the second side of the antenna sheet 510. The second electronic payment radiation pattern 530 may also be connected to the first electronic payment radiation pattern 520 to form a single electronic payment radiation pattern.

The second electronic payment radiation pattern 530 includes a third loop pattern 532. The third loop pattern 532 is formed on one surface of the antenna sheet 510. The third loop pattern 532 is wound multiple times along the outer circumference of the third area 513 on one surface of the antenna sheet 510. The third loop pattern 532 is disposed adjacent to the second side on one surface of the antenna sheet 510.

The second electronic payment radiation pattern 530 may further include a fourth loop pattern 534. The fourth loop pattern 534 is formed on the other surface of the antenna sheet 510. The fourth loop pattern 534 is disposed adjacent to the second side on the other surface of the antenna sheet 510. The fourth loop pattern 534 is wound multiple times along the outer circumference of the fourth area 514 on the other surface of the antenna sheet 510. The fourth loop pattern 534 may be connected to the third loop pattern 532 through a via hole (not illustrated).

The third area 513 and the fourth area 514 are partial areas of one surface and the other surface of the antenna sheet 510, and may be areas where all of parts thereof are overlapped.

Although it has been illustrated and described above that the first electronic payment radiation pattern 520 and the second electronic payment radiation pattern 530 are formed on all of one surface and the other surface of the antenna sheet 510, they are not limited thereto and may also be formed on only one of one surface and the other surface thereof.

Of course, one of the first electronic payment radiation pattern 520 and the second electronic payment radiation pattern 530 is formed on all of one surface and the other surface of the antenna sheet 510, and the other thereof may also be formed on only one of one surface and the other surface thereof.

A near field communication radiation pattern 540 is formed on the antenna sheet 510. The near field communication radiation pattern 540 is formed on the antenna sheet 510, and may be formed in a loop shape wound multiple times. The near field communication radiation pattern 540 is disposed between the first electronic payment radiation pattern 520 and the second electronic payment radiation pattern 530.

The near field communication radiation pattern 540 includes a fifth loop pattern 542.

The fifth loop pattern 542 is formed on one surface of the antenna sheet 510. The fifth loop pattern 542 may be formed in a loop shape wound multiple times along the outer circumference of the fifth area 515 of the antenna sheet 510. The fifth area 515 is disposed between the first area 511 and the third area 513. The fifth loop pattern 542 is disposed between the first loop pattern 522 and the third loop pattern 532.

The near field communication radiation pattern 540 includes a sixth loop pattern 544.

The sixth loop pattern 544 is formed on the other surface of the antenna sheet 510. The sixth loop pattern 544 may be formed in a loop shape wound multiple times along the outer circumference of the sixth area 516 of the antenna sheet 510.

The sixth area 516 is disposed between the second area 512 and the fourth area 514. The sixth loop pattern 544 is disposed between the second loop pattern 524 and the fourth loop pattern 534.

Although it has been illustrated and described above that the near field communication radiation pattern 540 includes all of the fifth loop pattern 542 and the sixth loop pattern 544, it is not limited thereto and may also include only one of the fifth loop pattern 542 and the sixth loop pattern 544.

The first magnetic sheet 550 is a plate-like substrate or a film made of a magnetic material. For example, the first magnetic sheet 550 is one selected from a nanocrystalline alloy ribbon sheet, an iron-based amorphous ribbon sheet, and a ferrite sheet.

The first magnetic sheet 550 is stacked on one of one surface and the other surface of the antenna sheet 510. The first magnetic sheet 550 is stacked on one surface facing the second magnetic sheet 560.

For example, when the second magnetic sheet 560 is stacked on the other surface of the antenna sheet 510, the first magnetic sheet 550 is stacked on one surface of the antenna sheet 510. When the second magnetic sheet 560 is stacked on one surface of the antenna sheet 510, the first magnetic sheet 550 is stacked on the other surface of the antenna sheet 510.

The area of the first magnetic sheet 550 is formed to be narrower than the area of the antenna sheet 510. One side of the first magnetic sheet 550 is disposed on the same line as the second side of the antenna sheet 510. The first magnetic sheet 550 is disposed to extend from the second side of the antenna sheet 510 inward (that is, in a first side direction) to overlap a part of the antenna sheet 510.

The first magnetic sheet 550 overlaps the second electronic payment radiation pattern 530. The first magnetic sheet 550 overlaps parts of the third loop pattern 532 and the fourth loop pattern 534 of the second electronic payment radiation pattern 530.

The second magnetic sheet 560 is a plate-like substrate or a film made of a magnetic material. The second magnetic sheet 560 is made of the same material as the first magnetic sheet 550. The second magnetic sheet 560 may also be made of a different material from the first magnetic sheet 550. The second magnetic sheet 560 is, for example, one selected from a nanocrystalline alloy ribbon sheet, an iron-based amorphous ribbon sheet, and a ferrite sheet.

The second magnetic sheet 560 is stacked on one of one surface and the other surface of the antenna sheet 510. The second magnetic sheet 560 is stacked on one surface facing the first magnetic sheet 550.

For example, when the first magnetic sheet 550 is stacked on the other surface of the antenna sheet 510, the second magnetic sheet 560 is stacked on one surface of the antenna sheet 510. When the first magnetic sheet 550 is stacked on one surface of the antenna sheet 510, the second magnetic sheet 560 is stacked on the other surface of the antenna sheet 510.

The area of the second magnetic sheet 560 is formed to be narrower than the area of the antenna sheet 510. The area of the second magnetic sheet 560 is formed to be broader than the area of the first magnetic sheet 550. One side of the second magnetic sheet 560 is disposed in the second area 512 of the antenna sheet 510, and the other side thereof is disposed in the fourth area 514 of the antenna sheet 510.

The second magnetic sheet 560 overlaps the first electronic payment radiation pattern 520, the second electronic payment radiation pattern 530, and the near field communication radiation pattern 540. The second magnetic sheet 560 overlaps parts of the first loop pattern 522 and the second loop pattern 524 of the first electronic payment radiation pattern 520. The second magnetic sheet 560 overlaps parts of the third loop pattern 532 and the fourth loop pattern 534 of the second electronic payment radiation pattern 530. The second magnetic sheet 560 overlaps the fifth loop pattern 542 and the sixth loop pattern 544 of the near field communication radiation pattern 540.

The first magnetic sheet 550 and the second magnetic sheet 560 form a first overlapping area 580. As the first magnetic sheet 550 extends from the first side toward the second side, and the second magnetic sheet 560 is disposed between the second area 512 and the fourth area 514 of the antenna sheet 510, the first magnetic sheet 550 and the second magnetic sheet 560 form the first overlapping area 580 in an area where the second electronic payment radiation pattern 530 is formed (that is, the third area 513 and the fourth area 514) and in a neighboring area.

When the area of the first overlapping area 580 is increased, the antenna performance of the electronic payment radiation pattern and the near field communication radiation pattern 540 is improved.

At this time, when the entire second electronic payment radiation pattern 530 and the first magnetic sheet 550 and the second magnetic sheet 560 are disposed to be overlapped with each other to increase the area of the first overlapping area 580, a recognition range for electronic payment may be rather decreased.

Accordingly, the area of the first overlapping area 580 may be increased in a range where the second electronic payment radiation pattern 530 and at least parts of the first magnetic sheet 550 and the second magnetic sheet 560 do not overlap the overlapping area.

For example, when the other side of the first magnetic sheet 550 is disposed at a position farthest from the second side of the antenna sheet 510 in the third area 513, and the other side of the second magnetic sheet 560 is disposed at a position closest to the second side of the antenna sheet 510 in the fourth area 514, the area of the first overlapping area 580 may be maximized.

The third magnetic sheet 570 is a plate-like substrate or a film made of a magnetic material. The third magnetic sheet 570 is made of the same material as the first magnetic sheet 550 and the second magnetic sheet 560. The second magnetic sheet 560 may also be made of a different material from the first magnetic sheet 550. The third magnetic sheet 570 is, for example, one selected from a nanocrystalline alloy ribbon sheet, an iron-based amorphous ribbon sheet, and a ferrite sheet.

The third magnetic sheet 570 is stacked on one of one surface and the other surface of the antenna sheet 510. The third magnetic sheet 570 is stacked on one surface facing the second magnetic sheet 560. The third magnetic sheet 570 is stacked on the same surface as the first magnetic sheet 550.

For example, when the second magnetic sheet 560 is stacked on the other surface of the antenna sheet 510, the third magnetic sheet 570 is stacked on one surface of the antenna sheet 510 together with the first magnetic sheet 550. When the second magnetic sheet 560 is stacked on one surface of the antenna sheet 510, the third magnetic sheet 570 is stacked on the other surface of the antenna sheet 510 together with the first magnetic sheet 550.

The area of the third magnetic sheet 570 is formed to be narrower than the area of the second magnetic sheet 560. One side of the third magnetic sheet 570 is disposed on the same line as the first side of the antenna sheet 510. The third magnetic sheet 570 is disposed to extend from the first side of the antenna sheet 510 inward (that is, in a second side direction) to overlap a part of the antenna sheet 510.

The third magnetic sheet 570 overlaps the first electronic payment radiation pattern 520. The third magnetic sheet 570 overlaps parts of the first loop pattern 522 and the second loop pattern 524 of the first electronic payment radiation pattern 520.

The second magnetic sheet 560 and the third magnetic sheet 570 form a second overlapping area 590. As the second magnetic sheet 560 is disposed between the second area 512 and the fourth area 514 of the antenna sheet 510, and the third magnetic sheet 570 extends from the second side toward the first side, the second magnetic sheet 560 and the third magnetic sheet 570 form the second overlapping area 590 in an area where the first electronic payment radiation pattern 520 is formed (that is, the first area 511 and the second area 512) and in a neighboring area.

When the area of the second overlapping area 590 is increased, the antenna performance of the electronic payment radiation pattern and the near field communication radiation pattern 540 is improved.

At this time, when the entire first electronic payment radiation pattern 520 and the second magnetic sheet 560 and the third magnetic sheet 570 are disposed to be overlapped with each other to increase the area of the second overlapping area 590, a recognition range for electronic payment may be rather decreased.

Accordingly, the area of the second overlapping area 590 may be increased in a range where the first electronic payment radiation pattern 520 and at least parts of the second magnetic sheet 560 and the third magnetic sheet 570 do not overlap the overlapping area.

For example, when the other side of the second magnetic sheet 560 is disposed at a position closest to the first side of the antenna sheet 510 in the second area 512, and the other side of the third magnetic sheet 570 is disposed at a position farthest from the first side of the antenna sheet 510 in the first area 511, the area of the second overlapping area 590 may be maximized.

While the preferred embodiment according to the present disclosure has been described above, it is understood that the present disclosure may be modified in various forms, and those skilled in the art may carry out various modifications and changes without departing from the claims of the present disclosure.

The invention claimed is:

1. An antenna module comprising:
an antenna sheet which has a radiation pattern formed thereon;
a first magnetic sheet which is disposed on one surface of the antenna sheet; and
a second magnetic sheet which is disposed on other surface of the antenna sheet,
wherein the first magnetic sheet and the second magnetic sheet form an overlapping area,
wherein the antenna sheet comprises a first radiation pattern which is disposed adjacent to a first side of the antenna sheet, and a second radiation pattern which is disposed adjacent to a second side facing the first side,
wherein the second radiation pattern comprises a third loop pattern wound multiple times on one surface of the antenna sheet, and a fourth loop pattern wound multiple times on other surface of the antenna sheet,
wherein the first magnetic sheet is stacked on the one surface of the antenna sheet and is overlapped with parts of the third loop pattern and the fourth loop pattern of the second radiation pattern,
wherein the second magnetic sheet is stacked on the other surface of the antenna sheet and is overlapped with the first radiation pattern and other parts of the third loop pattern and the fourth loop pattern of the second radiation pattern, and
wherein the first magnetic sheet forms the overlapping area with the second magnetic sheet in an area which is overlapped with the second radiation pattern.

2. The antenna module of claim 1,
wherein the first magnetic sheet forms the overlapping area with the second magnetic sheet in an area where an inner circumference of the second radiation pattern is disposed.

3. The antenna module of claim 1,
wherein one side of the first magnetic sheet is disposed on a same line as the second side of the antenna sheet, and other side of the first magnetic sheet overlaps an inner circumference of the second radiation pattern.

4. The antenna module of claim 1,
wherein one side of the second magnetic sheet is disposed on a same line as the first side of the antenna sheet, and other side of the second magnetic sheet overlaps an inner circumference of the second radiation pattern.

5. An antenna module comprising:
an antenna sheet which has a radiation pattern formed thereon;
a first magnetic sheet which is disposed on one surface of the antenna sheet;
a second magnetic sheet which is disposed on other surface of the antenna sheet; and
a third magnetic sheet which is disposed on the one surface of the antenna sheet, and spaced apart from the first magnetic sheet,
wherein the first magnetic sheet and the second magnetic sheet form a first overlapping area, and the second magnetic sheet and the third magnetic sheet form a second overlapping area,
wherein the antenna sheet comprises a first radiation pattern which is disposed adjacent to a first side of the antenna sheet, and a second radiation pattern which is disposed adjacent to a second side facing the first side,
wherein the first radiation pattern comprises a first loop pattern wound multiple times on one surface of the antenna sheet, and a second loop pattern wound multiple times on the other surface of the antenna sheet,
wherein the second radiation pattern comprises a third loop pattern is wound multiple times on one surface of the antenna sheet, and a fourth loop pattern is wound multiple times on the other surface of the antenna sheet,
wherein the first magnetic sheet is stacked on the one surface of the antenna sheet and is overlapped with parts of the third loop pattern and the fourth loop pattern,
wherein the second magnetic sheet is stacked on the other surface of the antenna sheet and is overlapped with parts of the first loop pattern and the second loop pattern and other parts of the third loop pattern and the fourth loop pattern,
wherein the third magnetic sheet is stacked on the one surface of the antenna sheet and is overlapped with other parts of the first loop pattern and the second loop pattern, and
wherein the second magnetic sheet forms the first overlapping area with the first magnetic sheet in an area which is overlapped with the second radiation pattern, and forms the second overlapping area with the third magnetic sheet in an area which is overlapped with the first radiation pattern.

6. The antenna module of claim 5,
wherein the second magnetic sheet forms the first overlapping area with the first magnetic sheet in an area where an inner circumference of the second radiation pattern is disposed.

7. The antenna module of claim 5,
wherein the second magnetic sheet forms the second overlapping area with the third magnetic sheet in an area where an inner circumference of the first radiation pattern is disposed.

8. The antenna module of claim 5,
wherein one side of the first magnetic sheet is disposed on a same line as the second side of the antenna sheet, and other side of the first magnetic sheet overlaps an inner circumference of the second radiation pattern.

9. The antenna module of claim 5,
wherein one side of the second magnetic sheet overlaps an inner circumference of the second radiation pattern, and other side of the second magnetic sheet overlaps an inner circumference of the first radiation pattern.

10. The antenna module of claim 5,
wherein one side of the third magnetic sheet is disposed on a same line as the first side of the antenna sheet, and other side of the third magnetic sheet overlaps an inner circumference of the first radiation pattern.

* * * * *